United States Patent [19]

Hulse et al.

[11] Patent Number: 5,743,635
[45] Date of Patent: Apr. 28, 1998

[54] PNEUMATICALLY TELESCOPING MAST

[75] Inventors: John A. Hulse, Akron; John C. Stearns, Medina, both of Ohio

[73] Assignee: The Will-Burt Company, Orrville, Ohio

[21] Appl. No.: 585,944

[22] Filed: Jan. 16, 1996

[51] Int. Cl.$^6$ ................................. F21V 21/22
[52] U.S. Cl. ..................... 362/385; 362/74; 362/419; 362/294
[58] Field of Search .................. 362/385, 66, 96, 362/285, 287, 286, 80, 74, 418, 419, 427, 428, 250, 431, 386, 294, 323, 413; 52/111, 115, 116, 117, 118, 119, 143

[56] References Cited

U.S. PATENT DOCUMENTS

| | | | |
|---|---|---|---|
| 4,413,451 | 11/1983 | Featherstone et al. | 52/28 |
| 4,488,209 | 12/1984 | Gosswiller | 362/250 |
| 5,066,866 | 11/1991 | Halliday . | |

FOREIGN PATENT DOCUMENTS

| | | |
|---|---|---|
| 0462503 A1 | 12/1991 | European Pat. Off. . |
| 2193395 | 2/1988 | United Kingdom . |
| 2277213 | 10/1994 | United Kingdom . |

OTHER PUBLICATIONS

Woodway Engineering, Limited, Brochure–*Hy–Light*, Sep. 11, 1996.

*Primary Examiner*—Thomas M. Sember
*Attorney, Agent, or Firm*—Vickers, Daniels & Young

[57] ABSTRACT

An improved pneumatically telescoping mast supported for pivotal movement in opposite directions is provided. The mast includes adjacent telescoping sections slidable relative to one another between retracted and extended positions. A pneumatic control system for displacing the mast sections between retracted and extended positions is also provided as is a system for pivoting the mast in opposite directions about the pivot axis between the horizontal and vertical positions. The mast includes a light source mounted at the other upper end of the mast which is capable of running on the same DC power source as the pneumatic control system and the mast pivoting system.

28 Claims, 5 Drawing Sheets

PNEUMATICALLY TELESCOPING MAST

The present invention relates to an improvement in pneumatically telescoping masts utilizing a single DC power supply for the light source in combination with other power requirements of the mast.

INCORPORATED BY REFERENCE

Featherstone U.S. Pat. No. 4,413,451 is incorporated by reference herein so that pneumatically actuated telescoping masts known in the art need not be described in detail hereinafter.

BACKGROUND OF THE INVENTION

A pneumatically actuated telescoping mast is well known in the prior art and is generally of such a nature that it may be mounted readily on the roof of a motor vehicle, such as an emergency vehicle or utility vehicle. In such arrangement the mast is generally used for positioning electrical devices, particularly lighting fixtures at an elevated point above the vehicle. The effect is to immediately light a large area above the vehicle. This allows that emergency procedures can be conducted under the light, such as at accident scenes or by utility work crews such as after a storm. Pneumatically actuated telescoping masts are particularly advantageous in such situations since they are light weight, compact in a retracted position and capable of being mounted on the roof of most emergency motor vehicles, including automobiles.

The prior art pneumatically telescoping masts are extended using air, under pressure, and in a fully extended position, are generally vertical. A pneumatic telescoping mast typically includes a compressor or other pneumatic control means which displaces telescoping mast sections between retracted and extended positions. Additionally, a pneumatically telescoping mast may include a mechanism for pivoting the mast between horizontal and vertical positions. Such an arrangement is disclosed in copending application Ser. No. 286,269 assigned to the assignee of the present invention. This arrangement is separate from the pneumatic control mechanism.

In many applications the pneumatic control mechanism is powered by an air compressor, connected to a DC power source and the mechanism for pivoting the mast is controlled by a DC motor located adjacent to the platform base from which the mast is raised. Alternatively, the air compressor or mechanism for pivoting the mast can be provided with power from an AC power source. However, where the telescoping mast is provided with a light source at the end, the light has been always necessarily powered by an AC power source. AC power has always been required because of the light intensity used on telescoping masts. Either a 110 volt or 220 volt power source has been required in order to provide adequate lighting intensity in which emergency personnel can work effectively.

Such an AC power source is generally run by a gasoline generator hooked to an alternator which then is attached to the light source via an electrical line. Generally speaking, the AC power source has been provided by the motor vehicle itself, though a self contained generator is possible. An AC power source generally requires that the vehicle or generator continue to run at all times to operate the light source. During an emergency situation in which the light is needed for rescue or other purposes, it is important that the generator or vehicle not run out of gas. If the gasoline supply is exhausted, the generator will shut down and the lights automatically turn off.

Two different types of AC power sources are generally used for pneumatically telescoping masts. The most typical has the power line running directly from the emergency vehicle alternator to the light source. Therefore, the emergency vehicle provides power to the light via the alternator, while the remainder of pneumatic mast functions run on DC power. The other AC power option involves providing a separate self-contained gasoline generator and alternator. However, such a unit is not typically seen since a self-contained generator and alternator would not only be redundant to the vehicle alternator, but also too heavy to be mounted on the roof of most emergency vehicles. As is well known and can be seen in the prior art, AC power requires heavy duty wiring insulation to protect against fire or electrical shock. This results in more bulk and weight added to the mast, since the wiring must be pulled up and pushed down during extension and retraction of the mast. As such, the extension and retraction mechanisms need to have a larger capacity and need to work harder than what otherwise might be required. This is especially true with variations in temperature. For instance, cold temperatures result in typical wiring insulation becoming less flexible and elastic, thereby requiring the extension and retraction mechanisms to work even harder to pull wire up the mast as the mast is being extended.

Certain systems of prior art telescoping masts already use 12 volt DC power as the preferred power source. These systems include the mechanism for pivoting the mast between horizontal and vertical positions as well as the pneumatic control mechanism. Generally these systems can run and be directly wired to the vehicle battery. However, in some cases, these same mast systems may be powered with self-contained DC power which is not connected to the vehicle at all. Thus, the pneumatic control mechanism or compressor and the mechanism for pivoting the mast typically runs on lower power than the light (12V or 24V DC as opposed to 110V or 220V AC) and indeed can be run on self-contained DC power. However, since the light must be run on AC power, the light is necessarily connected to the power generating system of the emergency vehicle at all times. Thus, the pneumatically telescoping masts are not readily transferrable to other emergency vehicles since they must be integrally connected to the AC power source of the host vehicle. The internal components of an AC system are spread out across the entire pneumatic mast. This increases manufacturing costs and time required for initial assembly. As such, the light fixture at the end of a telescoping mast powered by an AC power source is also not easily interchangeable with other types of devices which could be placed on the antenna. For instance, such devices may include transmitting or receiving antennas, location devices or signal devices. The installation of a different electrical fixture usually requires complete rewiring of the fixture, which is necessarily complicated. Even the replacement of the light is also complex and complicated. Such designs do not meet current demands of versatility and interchangability.

SUMMARY OF THE INVENTION

Accordingly, it is a feature of the present invention to provide a pneumatically telescoping mast which overcomes the disadvantages of prior art pneumatically telescoping masts in that a telescoping mast is economically manufactured and assembly is simplified by combining the electrical components to rely upon only one DC power system. The invention allows a telescoping mast and the utility light thereon to be operated by the same power source as the pneumatic control system or mast pivoting system, thereby simplifying overall design and increasing the flexibility of uses.

This feature, along with other features of the present invention, is achieved in a pneumatically telescoping mast supported for pivotal movement in opposite directions about a horizontal mast axis, the mast including adjacent telescoping sections slidable relative to one another between retracted and extended positions. A pneumatic control mechanism is provided for displacing the mast sections between the retracted and extended positions. A pivoting mechanism is also provided which allows and controls the mast to pivot about an axis between horizontal and vertical positions. The mast includes a light source mounted to one of the telescoping sections and a DC power supply which provides electrical power to the light source as well as providing power to other power portions of the telescoping mast.

In accordance with the more specific feature of the invention, the DC power supply also provides power to the pivoting mechanism and the pneumatic control mechanism or compressor. An electronic inverter is provided adjacent the light source to convert the DC power to AC power directly at the light mount. In a preferred embodiment, the light source and the electronic inverter are provided in a single enclosed module. The module includes a heat sink which is adjacent the electronic inverter. The heat sink is also removable as a unit together with the electronic inverter.

The DC power supply may be of any standard DC power supply including a 12 volt battery, or a 24 volt supply. In one embodiment the DC power may be provided by the vehicle battery which is kept charged and recharged by the engine and alternator of the vehicle.

In accordance with another aspect of the invention, the telescoping mast is provided with a DC motor mechanism which includes a first motor for moving the lighting source horizontally and a second motor for moving the lighting source vertically relative to the stationary position of the mast. In a preferred embodiment of the invention, the light source is a metal halide light source which provides the largest amount of lighting intensity, as measured in lumens, for the amount of DC power required.

Thus, it is a principal object of the present invention to provide a pneumatically telescoping mast with an improved light source at its end which obtains power from a DC power supply.

It is yet another object of the present invention to provide a pneumatically actuated telescoping mast with a utility light and other electrical power requirements of the mast, all powered by a DC power supply.

Still another object of the present invention is to provide an improved pneumatically actuated telescoping mast which provides a more reliable light source than other telescoping masts and which does not require an AC power source.

Yet another object of the invention is to provide an improved pneumatically telescoping mast which will not abruptly shut down when a vehicle engine power source is turned off.

Still yet another object of the invention is to provide an improved pneumatically operated telescoping mast in which the wiring hook-up to the light source can be made with lighter and less expensive wiring, thus reducing air pressure requirements to extend and retract the mast, reduce weight along the length of the mast and reduce motor load and motor burnout in the pivot mechanism.

Further, another object of the present invention is to provide a telescoping mast utility light as a single enclosed module.

These and other objects of the invention will become apparent to those skilled in the art upon reading and understanding the following detailed description of preferred embodiments.

BRIEF DESCRIPTION OF THE DRAWINGS

The invention may take physical form in certain parts and arrangement of parts, preferred embodiments of which will be described in detail and illustrated in the accompanying drawings which form a part hereof and wherein.

THE PREFERRED EMBODIMENT

Figure 1:
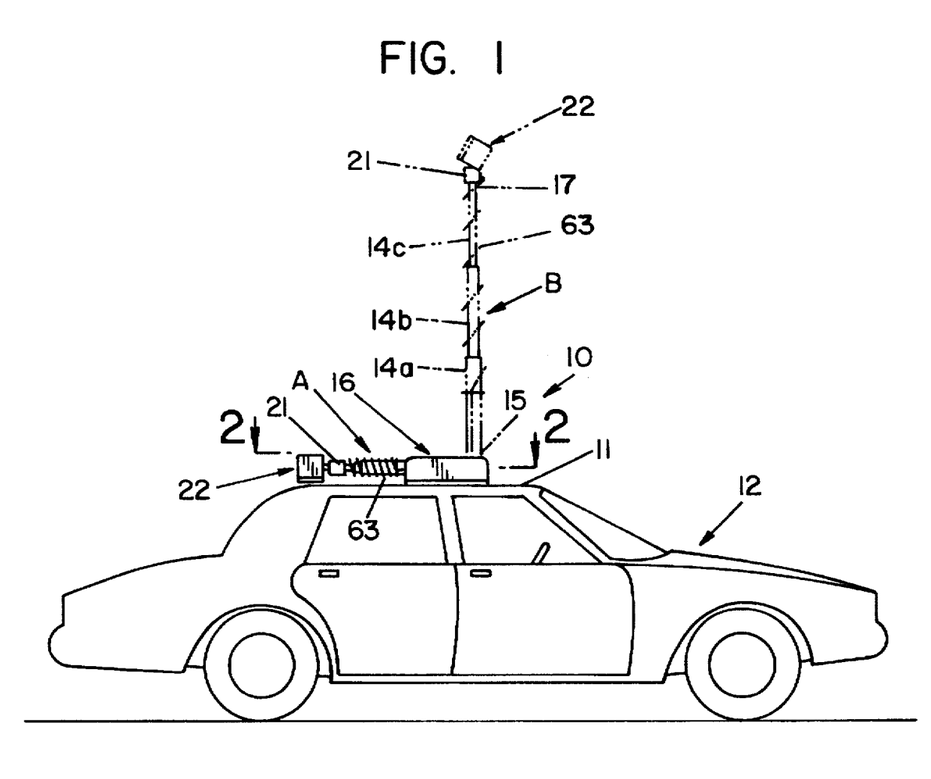
FIG. 1 is a pictorial view illustrating one use of the telescoping mast of the present invention.

Referring to the drawings, wherein the showings are for the purpose of illustrating the preferred embodiment of the invention only and not for the purpose of limiting same, FIG. 1 shows a telescoping mast 10 mounted on the roof 11 of a motor vehicle 12. Mast 10 is shown at rest or at a traveling position, identified by arrow A, parallel to roof 11. Mast 10 is shown in phantom lines in an extended vertical position, arrow B, perpendicular to roof 11. In accordance with the present invention, the mast is capable of being placed at a tilt angle between 0° and 90° where, for the purpose of this description, 0° is defined as being parallel with vehicle roof 11 and generally horizontal, as at position A, while 90° is perpendicular to vehicle roof 11 and in a generally vertical position, in accordance with position B.

As shown at position B, telescoping mast 10 is comprised of the adjacent telescoping sections 14a–14d. In the preferred embodiment, telescoping section 14a is at the lower mast end 15 of mast 10 and is pivotally mounted to the base 16 which is then mounted to vehicle roof 11. Each of telescoping sections 14a–14d are relatively rigid tubular sections facilitating the pneumatic extension and retraction of telescoping mast 10. Mounted at the upper mast end 17, at telescoping section 14d, is a wiring box assembly 21 to facilitate the placement of utility light 22 at upper mast end 17.

Figure 2:
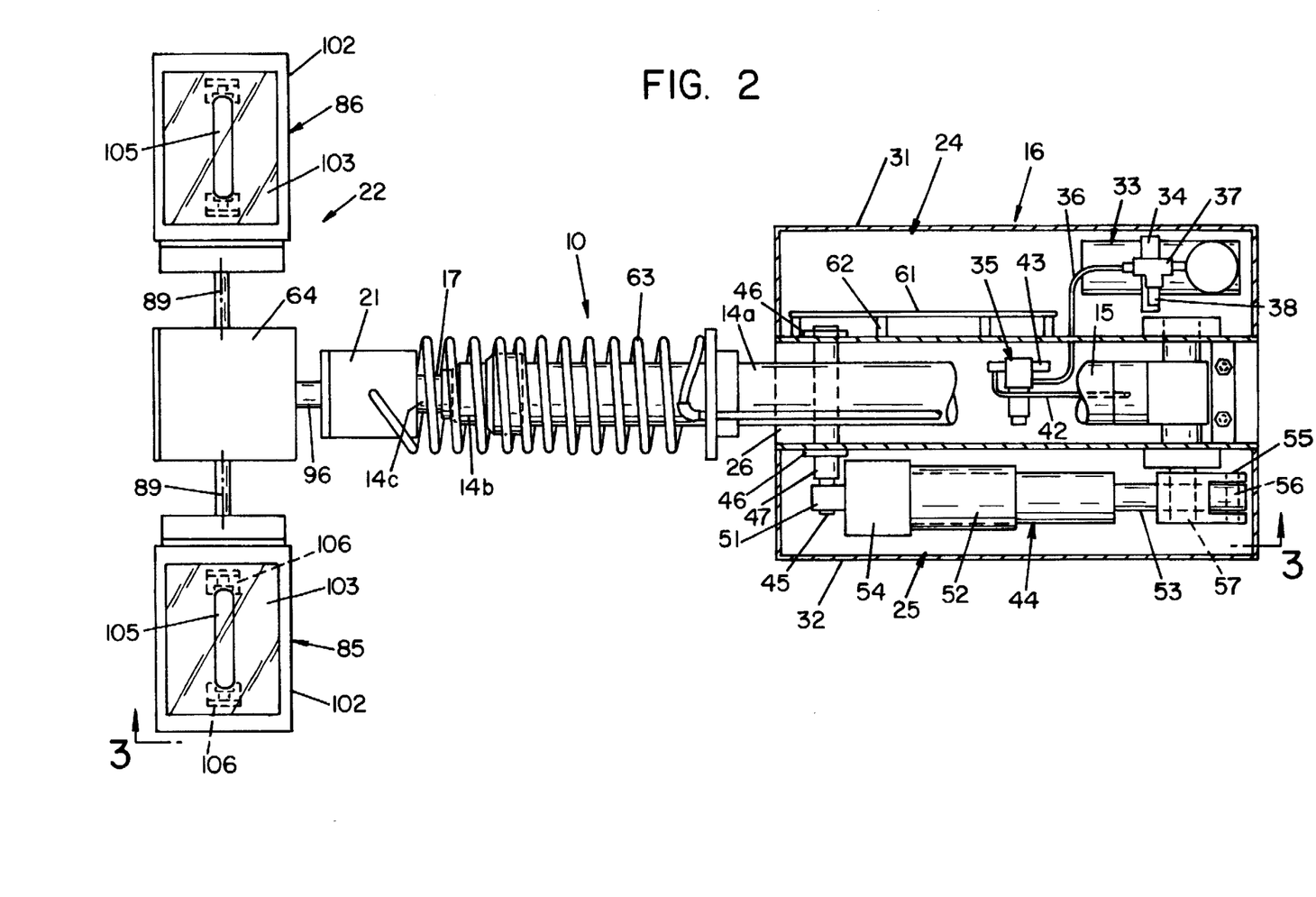
FIG. 2 is a plan view of the telescoping mast, partially in cross-section, taken along line 2—2 of FIG. 1.

As best shown in FIG. 2, base 16 includes the two rectangular enclosures 24 and 25 forming a channel 26 therebetween in which telescoping mast 10 is placed. Each of rectangular enclosures 24, 25 include the perimeter walls 31 and 32, respectively. Contained within enclosure 24 is an air compressor 33 used to inflate telescoping mast 10. Preferably, this compressor is capable of obtaining 35 psi and runs on 12 volt DC power. Compressor 33 is mounted to base 16 via the bracket 34. Air from compressor 33 is supplied to an up/down solenoid valve 35 through a polyethylene air supply tube 36 and is controlled by check valve 37 and the pressure release valve 38. Solenoid valve 35 controls the extension and retraction of mast 10 through a polyurethane supply tube 42 with air pressure controlled by a metering valve 43 on solenoid valve 35.

Contained within rectangular enclosure 25 is a tilt actuator 44 mounted to an actuator shaft 45 extending transversely across channel 26 and mounted to perimeter walls 31 and 32 of enclosures 24 and 25, respectively. Tilt actuator 44 manipulates the mast and the angle of the mast between positions A and B. In the preferred embodiment, tilt actuator 44 is a ball screw which utilizes a ball nut and screw. However, it will be appreciated that tilt actuator 44 may also be any known actuator including a hydraulic piston. At opposite ends, actuator shaft 45 is supported and mounted to walls 31, 32 by the support blocks 46. A spacer block 47 is placed on actuator shaft 45 within enclosure 25 between one support block 46 and the pivot mounting bracket 51 of tilt actuator 44. Pivot mounting bracket 51 extends from tilt actuator 44 and is placed over actuator shaft 45. Thus, as tilt actuator 44 pivots mast 10 between horizontal and vertical positions, tilt actuator 44 is allowed to rotate slightly about actuator shaft 45.

Figure 3:
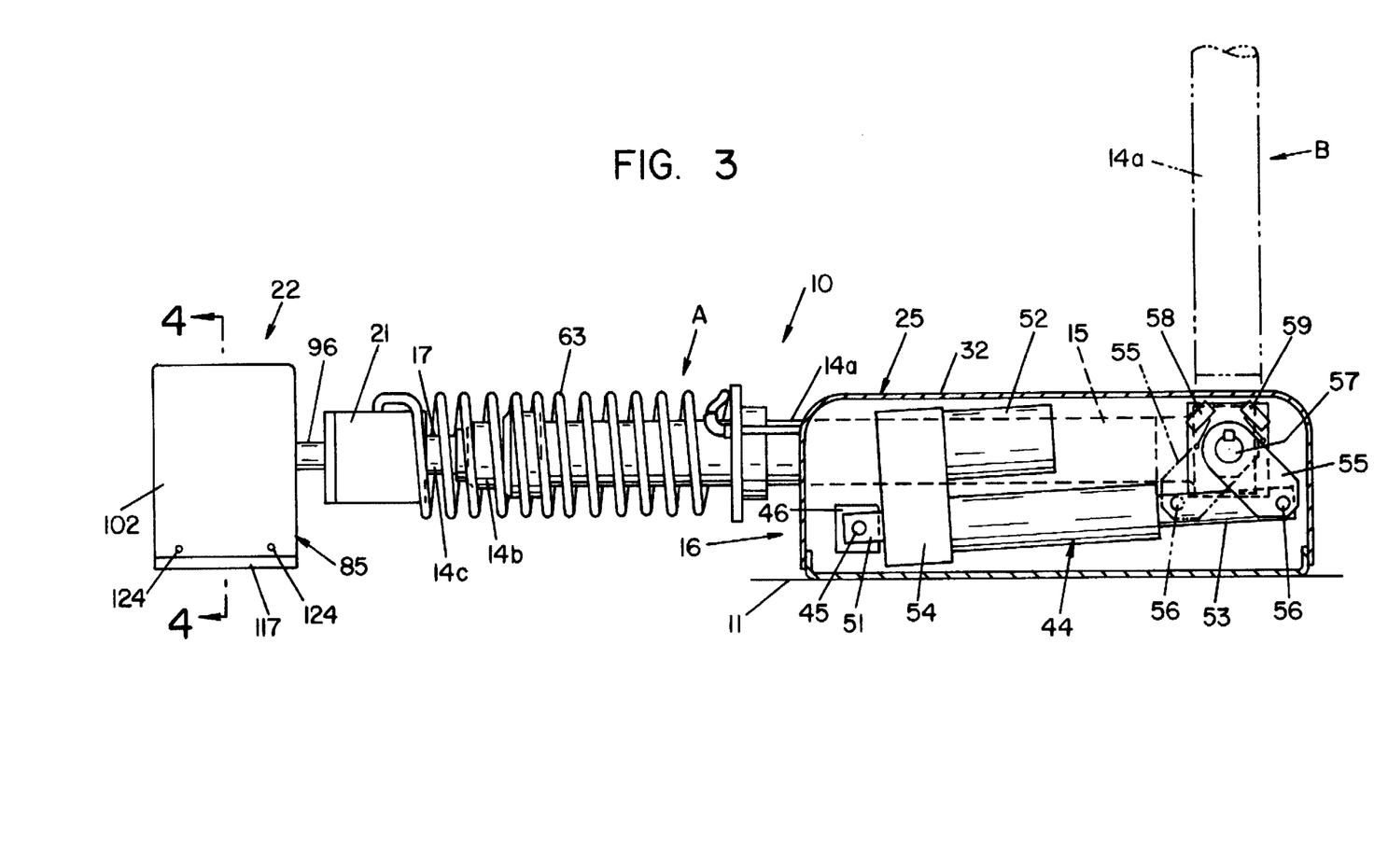
FIG. 3 is an elevation view of the telescoping mast, partially in cross-section, taken along line 3–3 of FIG. 2.

As shown, a DC mast drive motor 52 drives tilt actuator 44 through a gear box 53 to drive a piston rod 53. The extension and retraction of piston rod 53 causes a linkage 55 to rotate about a pivot pin 56 which connects piston rod 53 and linkage 55. In turn, linkage 55 causes the mast shaft 57 to rotate between two extreme positions, about 90° apart in order that mast 10 rotates between horizontal (position A) and vertical (position B). When piston rod 53 is in the extended position as shown in FIGS. 2 and 3, mast 10 is in the horizontal position A. When piston rod 53 is retracted, as shown by the phantom lines in FIG. 3, linkage 55 and shaft 57 rotate in order that mast 10 be placed in vertical position B. Limit switches 58 and 59 are located at the horizontal and vertical positions of mast 10 adjacent linkage 55 within enclosure 25. As is well known in the art, such limit switches stop mast 10 at opposite extreme positions, i.e. horizontal position A and vertical position B.

A control circuit board 61 is mounted to wall 31 within enclosure 24 by mounting pins 62. Control board 61 is linked to a power source, such as a 12V DC battery within vehicle 12. Signals from control board 61 operate tilt actuator 44 in order to pivot mast 10 and air compressor 33 in order to extend and retract mast 10, as will be described in greater detail hereinafter. Also running from control board 61 is nycoil conduit 63. As will be appreciated from the prior art, nycoil is essentially coiled cable conduit having a hollow interior through which the necessary wiring to light source 22 is pulled. Wiring in nycoil conduit 63 provides DC power to light source 22 at upper mast end 17. Nycoil conduit 63 is helical about the outer circumference of mast 10 and is capable of extending and retracting with mast 10. At upper mast end 17, nycoil conduit 63 terminates at wiring box assembly 21. Therein, the wiring then continues to remote control positioner enclosure 64.

Figure 4:
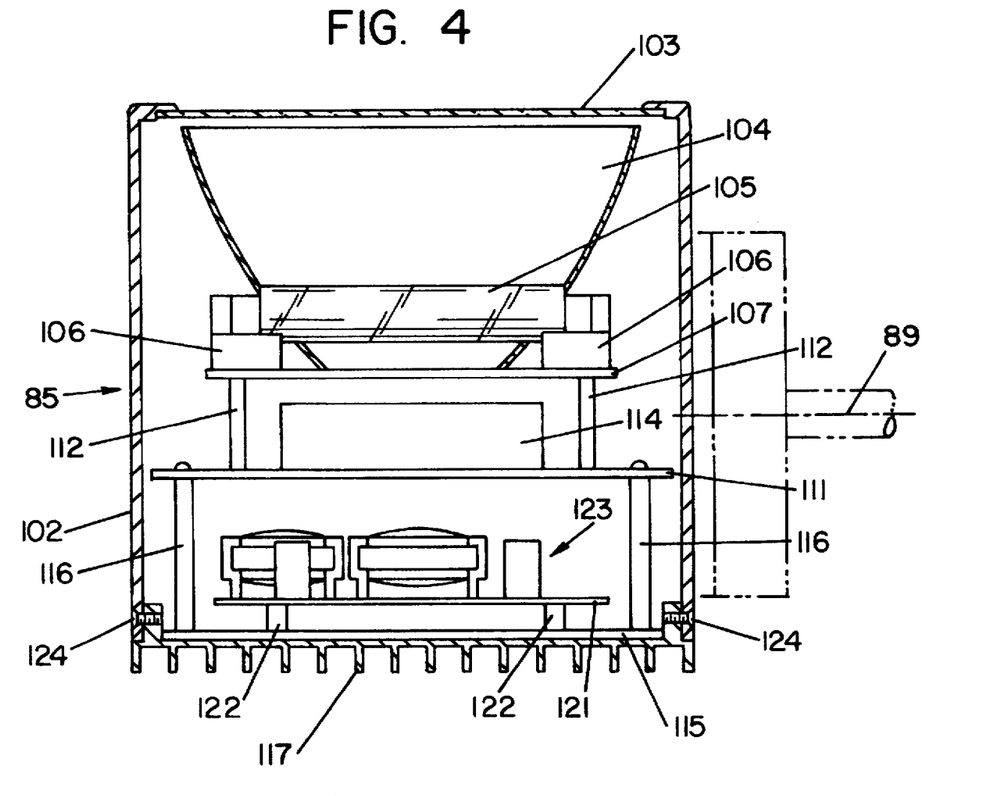
FIG. 4 is a cross-sectional view of one feature of the present invention taken along line 4–4 of FIG. 3.
Figure 5:
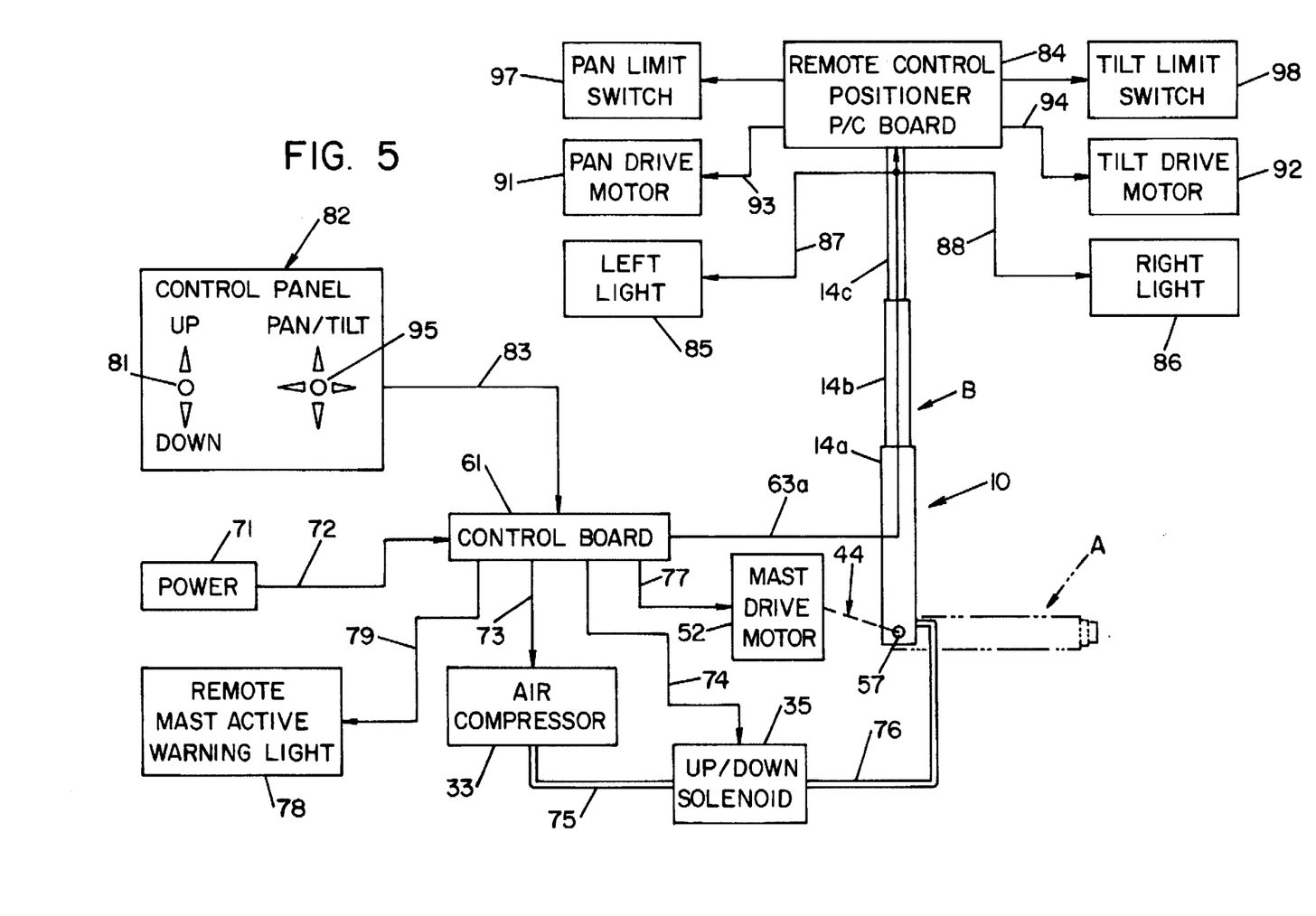
FIG. 5 is a flow diagram showing the overall control system for the present invention.

The operation of mast 10 and specifically light source 22 is best seen in FIGS. 4 and 5. DC power source 71, preferably 12 or 24 volt DC supply, is provided to control board 61 by a line 72. From control board 61 the signals for all of the mast operations are processed. Control board 61 is hooked to air compressor 33 by a line 73 and is wired to up/down solenoid valve 35 by a line 74. Upon a signal from control board 61, solenoid valve 35 utilizes air from air compressor 33, supplied by a supply line 75 to inflate mast 10 through an air supply line 76. Control board 61 also provides the signal to mast drive motor 52 through a line 77, which in turn actuates tilt actuator 44 in order to move mast 10 from a horizontal to vertical position or vice versa. An operator can control each of these functions by the up/down switches 81 on a control panel 82 which provides the signals to control board 61 through the line 83. Remote mast active warning light 78, connected to control board 61 via line 79 is placed in the vehicle to alert the operator when light 22 is active.

DC power supply 71, through control board 61, powers remote control positioner PC board 84 by the wiring 63a in nycoil conduit 63 as well as providing power to the left light 85 and the right light 86 by the wiring line 87 and the wiring line 88, respectively. PC board 84 is located within remote control positioner enclosure 64, together with a pan drive motor 91 and a tilt drive motor 92 connected to PC board 84 by the lines 93 and 94, respectively. Control panel 82 allows an operator to control each of motors 91 and 92 by the pan/tilt switches 95. It will be appreciated that pan drive motor 91 causes light source 22 to rotate in a generally 360° configuration about a swivel point 96 between wiring box assembly 21 and positioner enclosure 64. Tilt drive motor 92 causes each of lights 85, 86 to pivot between horizontal and vertical positions about axis 89 to achieve better directional aiming of light source 22. The extent of rotation about swivel point 96 is limited by a pan limit switch 97, while the extent of tilt about axis 89 is controlled by a tilt limit switch 98.

Left light 85 is described in detail hereinafter. It will be appreciated that right light 86 is identical to left light 85 and thus such description will not be repeated for right light 86. As shown, an outer cover assembly 102 encloses light 85, with one side having a glass cover 103. A reflector 104 is opposite glass 103 while a bulb 105 is placed adjacent reflector 104. In the preferred embodiment, the bulb is a metal halide bulb. Bulb 105 is snapped into the lamp connecters 106 located on a reflector mating plate 107 from which reflector 104 extends. Reflector mating plate 107 is connected to a ballast mating plate 111 by the spacers 112 in order that left light 85 is properly balanced about axis 89. The ballast 114, generally a solid metal plate of known weight, is affixed to ballast mating plate 111. Ballast mating plate 111 is connected to a PC light board mating plate 115 by the supports 116. PC light board mating plate 115 is attached to a heat sink 117 and supports PC light board assembly 121 at the spacing screws 122. PC light board assembly 122 includes an electronic inverter 123 in which the DC signal from line 87 is converted to an AC signal before being sent to bulb 105. This arrangement eliminates the prior art requirements of an AC power source for the light. Light 85 is also provided with assembly screws 124. Upon removing assembly screws 124, the internal components of light 85 can be removed from within cover assembly 102 for repair of the light or replacement of the component parts, including bulb 105. This type of modular enclosure is not provided in prior art telescoping mast light enclosures. The AC lighting system of the prior art does not provide this versatility. Thus, the one piece modular mounting of internal components is another advantage of the present invention.

One of the advantages of the design of the present invention is the elimination of the heavy duty wiring and insulation previously required for AC lighting requirements. Such heavier gauge material is harder to expand and retract with the expansion and retraction of mast 10. This places requirements on air compressor 33 to provide greater air pressure to not only inflate mast sections 14a–14d, but also extend nycoil 63. A DC power source is also easier to connect and disconnect from a vehicle by simply connecting wires to the vehicle battery. The invention also eliminates the necessity seen in the prior art for multiple power sources. The invention allows that light source 22, which previously required an AC power source, now only requires a DC power source. DC power requirements also mean that the vehicle or generator need not be run at all times in order to operate light 22.

The invention has been described with reference to the preferred embodiments. Obviously, modifications and alterations will occur to others upon reading and understanding this specification. For example, control panel 82 can be placed within the vehicle or optionally made part of the remote hand held type, thus allowing positioning of light 22 from outside vehicle 12. Warning light 78 may also be placed on the control panel 82 or placed in both locations if control panel 82 utilizes the hand held remote option. It is intended to include all such modifications and alterations in so far as they come within the scope of the appended claims.

Having thus described the invention, it is claimed:

1. In a pneumatically telescoping mast supported for pivotal movement in opposite directions about a horizontal mast axis, said mast including adjacent telescoping sections slidable relative to one another between retracted and extended positions, means including pneumatic control means for displacing said mast sections between said retracted and extended positions, and means for pivoting said mast in opposite directions about said pivot axis between horizontal and vertical positions, the improvement comprising: said mast including lighting means for illumination mounted to one of said adjacent telescoping sections and DC power supply means for providing electrical power to said mast system, for providing power to said lighting means and said means for pivoting and including means adjacent said lighting means for converting DC power to AC power whereby AC power is provided to said lighting means.

2. The telescoping mast of claim 1, wherein said DC power supply means provides power to said pneumatic control means.

3. The telescoping mast of claim 1, wherein said means for converting includes an electronic inverter adjacent said light mount.

4. The telescoping mast of claim 1, wherein said lighting means and said means for converting is provided in a single enclosed module.

5. The telescoping mast of claim 4, wherein said module includes a heat sink adjacent said means for converting.

6. The telescoping mast of claim 5, including means for releasably mounting said means for converting and said heat sink within said module whereby said means for converting and said heat sink are removable as a unit from said single enclosed module.

7. The telescoping mast of claim 4, including means for releasably mounting said means for converting from within said single enclosed module.

8. The telescoping mast of claim 1, wherein said lighting means includes a metal halide light.

9. The telescoping mast of claim 1, wherein said DC power supply means includes battery supply means.

10. The telescoping mast of claim 9, wherein said battery supply means is a 12 volt supply.

11. The telescoping mast of claim 9, wherein said battery supply means is a 24 volt supply.

12. In a pneumatically telescoping mast supported for pivotal movement in opposite directions about a horizontal mast axis, said mast including adjacent telescoping sections slidable relative to one another between retracted and extended positions, means including pneumatic control means for displacing said mast sections between said retracted and extended positions, and means for pivoting said mast in opposite directions about said pivot axis between horizontal and vertical positions, the improvement comprising: said mast including lighting means for illumination mounted to one of said adjacent telescoping sections, DC motor means adjacent said lighting means for positioning said lighting means horizontally and vertically relative to said mast, DC power supply means for providing electrical power to said lighting means and said DC motor means and means adjacent said lighting means for converting said DC power to AC power whereby AC power is provided to said lighting means.

13. The telescoping mast of claim 12, wherein said means for pivoting is also connected to said DC power supply means.

14. The telescoping mast of claim 13, wherein said DC motor means includes a first motor for rotating said lighting means horizontally and a second motor for moving said lighting means vertically.

15. The telescoping mast of claim 14, wherein said lighting means includes at least one metal halide light source.

16. The telescoping mast of claim 15, wherein said lighting means includes two adjacent metal halide light sources.

17. The telescoping mast of claim 12, wherein said DC power supply means provides power to said pneumatic control means.

18. The telescoping mast of claim 12, wherein said means for converting includes an electronic inverter adjacent said light mount.

19. The telescoping mast of claim 12, wherein said lighting means and said means for converting is provided in a single enclosed module.

20. The telescoping mast of claim 19, wherein said module includes a heat sink adjacent said means for converting.

21. The telescoping mast of claim 20, including means for releasably mounting said means for converting and said heat sink within said module whereby said means for converting and said heat sink are removable as a unit from said single enclosed module.

22. The telescoping mast of claim 19, including means for releasably mounting said means for converting from within said single enclosed module.

23. The telescoping mast of claim 12, wherein said lighting means includes at least one metal halide light source.

24. The telescoping mast of claim 12, wherein said DC power supply means includes battery supply means.

25. The telescoping mast of claim 24, wherein said battery supply means is a 12 volt supply.

26. The telescoping mast of claim 24, wherein said battery supply means is a 24 volt supply.

27. In a pneumatically telescoping mast supported for pivotal movement in opposite directions about a horizontal mast axis, said mast including adjacent telescoping sections slidable relative to one another between retracted and extended positions, means including pneumatic control means for displacing said mast sections between said retracted and extended positions, and means for pivoting said mast in opposite directions about said pivot axis between horizontal and vertical positions, the improvement comprising: said mast including lighting means for illumination mounted to one of said adjacent telescoping sections and DC power supply means located remotely from said lighting means for providing electrical power to said lighting means and means for converting said DC power to AC power located directly adjacent said lighting means, said AC power providing electrical power to said lighting means.

28. In a pneumatically telescoping mast supported for pivotal movement in opposite directions about a horizontal mast axis, said mast including adjacent telescoping sections slidable relative to one another between retracted and extended positions, a pneumatic control system for displacing said mast sections between said retracted and extended positions, and a pivoting system for pivoting said mast in opposite directions about said pivot axis between horizontal and vertical positions, the improvement comprising: said mast including at least one light for illumination mounted to one of said adjacent telescoping sections and a DC power supply source located remotely from said at least one light and an inverter located directly adjacent said at least one light for converting said DC power to AC power, said AC power providing electrical power to said light.

* * * * *